United States Patent
Lee et al.

(10) Patent No.: US 9,036,815 B2
(45) Date of Patent: May 19, 2015

(54) METHOD FOR ACOUSTIC ECHO CANCELLATION AND SYSTEM THEREOF

(75) Inventors: Junghsi Lee, Taoyuan County (TW); Hsu-Chang Huang, Taoyuan County (TW)

(73) Assignee: YUAN ZE UNIVERSITY, Taoyuan County (TW)

( * ) Notice: Subject to any disclaimer, the term of this patent is extended or adjusted under 35 U.S.C. 154(b) by 412 days.

(21) Appl. No.: 13/487,198

(22) Filed: Jun. 2, 2012

(65) Prior Publication Data

US 2013/0322638 A1     Dec. 5, 2013

(51) Int. Cl.
*H04M 9/08* (2006.01)
*H04B 3/23* (2006.01)
*H04L 25/02* (2006.01)
*H04L 25/03* (2006.01)

(52) U.S. Cl.
CPC ............ *H04B 3/235* (2013.01); *H04L 25/0212* (2013.01); *H04L 25/0224* (2013.01); *H04L 25/03038* (2013.01); *H04B 3/238* (2013.01)

(58) Field of Classification Search
CPC ............................. H04M 9/082; H04B 3/238
USPC ..................................................... 379/406.08
See application file for complete search history.

(56) References Cited

U.S. PATENT DOCUMENTS 5,745,564 A * 4/1998 Meek .................... 379/406.08
5,764,753 A * 6/1998 McCaslin et al. ........ 379/406.07

OTHER PUBLICATIONS

Hsu-Chang Huang and Junghsi Lee, A New Variable Step-Size NLMS Algorithm and Its Performance Analysis, IEEE Transactions on Signal Processing, vol. 60, Issue 4, pp. 2055-2060.

* cited by examiner

*Primary Examiner* — Alexander Jamal
(74) *Attorney, Agent, or Firm* — Li & Cai Intellectual Property (USA) Office

(57) ABSTRACT

The spirit of the present invention is to vary the step size parameter in accordance with the error signal and the output acoustic signal, wherein the filter is easy to implement, non-parametric VSS-NLMS algorithm which employs the mean-square error and the estimated system noise power to control the step-size update. The new nonparametric VSS-NLMS algorithm has been shown to perform with fast convergence rate, good tracking, and low mis-adjustment. In comparison with existing VSS-NLMS algorithms, the proposed algorithm has demonstrated consistently superior performance both in convergence and for final error level relative to published algorithms in application on both simulated data and real speech data.

26 Claims, 12 Drawing Sheets

COMPARISON OF THEORETICAL AND EXPERIMENTAL $\sigma_e^2(\infty)$ AND $SD(\infty)$ FOR
$\beta = 30$, $\sigma_x^2 = 10$, $\sigma_v^2 = 0.1$. THEORETICAL VALUES $\sigma_e^2(\infty) = 0.10172465$,
$SD(\infty) = 0.00017247$

| Input Signal | $M$ | $\dfrac{\lvert \sigma_e^2(\infty) - \hat{\sigma}_e^2(\infty) \rvert}{\sigma_e^2(\infty)}$ |
|---|---|---|
| White Gaussian | 64 | 0.1013 % |
| White Gaussian | 128 | 0.1812 % |
| White Gaussian | 256 | 0.0341 % |
| AR(1) Process | 64 | 0.1987 % |
| AR(1) Process | 128 | 0.1244 % |
| AR(1) Process | 256 | 0.2321 % |
| MA(3) Process | 64 | 0.2813 % |
| MA(3) Process | 128 | 0.0637 % |
| MA(3) Process | 256 | 0.0914 % |

FIG. 6

System distance curves of the proposed VSS-NLMS algorithm with four different values of $\beta$ (5, 15, 30, 50, 75, and 100). The impulse response changes signs at time 5. The input signal is a white Gaussian process with $\sigma_x^2 = 1$, $\sigma_v^2 = 0.01$, and $M = 128$.

| | |
|---|---|
| Algorithm: | Kwong's VSS-LMS[1] |
| | $\mu(n+1) = \alpha\mu(n) + \gamma e^2(n)$ |
| Parameters: | $\alpha = 0.998$, $\gamma = 5 \times 10^{-7}$, $\mu(0) = 0.01$ |
| | $\mu_{min} = (8 \times 10^{-4})/\sigma_x^2$, $\mu_{max} = (8 \times 10^{-3})/\sigma_x^2$ |
| Algorithm: | Benesty's NPVSS[6] |
| | $\mu(n) = \begin{cases} 1 - \dfrac{\sigma_v}{\hat{\sigma}_e(n) + \delta}, & \text{if } \hat{\sigma}_e(n) \geq \sigma_v \\ 0, & \text{otherwise} \end{cases}$ |
| | $\hat{\sigma}_e^2(n) = \lambda \hat{\sigma}_e^2(n-1) + (1-\lambda) e^2(n)$ |
| Parameters: | $\varepsilon = 20\sigma_v^2$, $\delta = 10^{-3}$, $\lambda = 0.996$ |
| Algorithm: | Choi's RR-NLMS[5] |
| | $\varepsilon'(n) = \varepsilon(n-1) - \rho \operatorname{sgn}\left[ e(n)e(n-1)\mathbf{x}(n)\mathbf{x}^T(n-1) \right]$ |
| | $\varepsilon(n) = \begin{cases} \varepsilon'(n) & \text{if } \varepsilon'(n) \geq \varepsilon_{min} \\ \varepsilon_{min} & \text{if } \varepsilon'(n) < \varepsilon_{min} \end{cases}$ |
| Parameters: | $\varepsilon_{min} = 0.1$, $\rho = 0.15$, $\varepsilon(0) = 0.1$ |
| Algorithm: | Proposed VSS-NLMS |
| Parameters: | $\alpha = 0.998$, $\mu(0) = 1$, $\varepsilon = 0.1$, $\mu_{min} = 10^{-5}$, $\mu_{max} = 1$, |
| | $\beta = 30$, $\zeta_{th} = 0.35$ |

FIG. 8

System distance curves of NLMS (step-size is 1) and four VSS algorithms. The input signal is male speech (mandarin), $M = 128$, $\sigma_v^2 = 0.001$.

System distance curves of NLMS (step-size is 1) and four VSS algorithms. The input signal is female speech (English), $M = 128$ and $\sigma_v^2 = 0.001$.

METHOD FOR ACOUSTIC ECHO CANCELLATION AND SYSTEM THEREOF

BACKGROUND

1. Technical Field

The present disclosure relates to the technical field of an acoustic echo cancellation, in more particular, to a method for acoustic echo cancellation and a echo cancellation system thereof.

2. Description of Related Art

Acoustic echo interference usually occurs in a communication system and an audio system, such as mobile phone, video conference, telecommunication conference, VOIP phone and so on. There are two primary acoustic elements, which are woofer and microphone. When the two elements are disposed in an enclosure space or close to each other, where the soundwave energy is enough to transmit from the woofer to the microphone, its generating echo would greatly decrease the quality of communication and user may have an auditorily-uncomfortable feeling.

FIG. 1 illustrates a system block diagram depicting a system for acoustic echo cancellation in a conventional art. Referring to FIG. 1, the system includes a microphone 101, a speaker 102, a echo cancellation module 103 and a adaptive filter 104, wherein the adaptive filter 104 uses the adaptive filtering algorithm to generate a signal $\hat{d}(n)$ approximated to the echo signal $d(n)$ such that the echo cancellation module 103 could cancel the echo with the signal.

Adaptive filtering algorithms have been widely employed in many signal processing applications such as equalization, active noise control, acoustic echo cancellation, and biomedical engineering. The normalized least-mean-square (NLMS) adaptive filter is the most popular due to its simplicity. The stability of the basic NLMS is controlled by a fixed step-size $\mu_c$. This parameter also governs the rate of convergence, speed of tracking ability and the amount of steady-state excess mean-square error (MSE). Aiming to solve the conflicting objectives of fast convergence and low excess MSE associated with the conventional NLMS, a number of variable step-size NLMS (VSS-NLMS) algorithms have been presented in the past two decades.

Kwong used the power of instantaneous error to derive a variable step-size LMS (VSS-LMS) filter. This VSS-LMS employs a larger step size when the estimation error is large, and vice versa. Aboulnasr pointed out that the advantageous performance of this VSS-LMS and several other variable step-size LMS algorithms is usually obtained in a high signal-to-noise environment. She then developed a scheme using the autocorrelation of errors to alleviate the influence of uncorrelated disturbance. Recently Shin, Sayed, and Song developed a variable step-size affine projection algorithm, which employs the norm of the filter coefficient error vector as a criterion for optimal variable step-size.

Another type of variable step-size algorithm is the regularized NLMS. Mandic derived a generalized normalized gradient descent (GNGD) algorithm, which updates the regularization parameter gradient adaptively. Choi presented a robust regularized NLMS (RR-NLMS) filter, which uses a normalized gradient to update the regularization parameter. It should be noted that the RR-NLMS is effectively a "sign GNGD" algorithm. While most variable step-size algorithms need to tune several parameters for better performance, Benesty introduced a relatively tuning-free nonparametric VSS-NLMS (NPVSS) algorithm.

This invention presents a new nonparametric algorithm, which employs the MSE and the estimated system noise power to control the step-size update. The motivation is that a large MSE increases step-size and a large system noise decreases step-size, and vice versa. Our new VSS-NLMS is easy to implement and gives very good performance.

SUMMARY

An object of the present invention is to provide a method for acoustic echo cancellation, wherein a new nonparametric algorithm, which employs the MSE and the estimated system noise power to control the step-size update, is adopted such that the hardware thereof would be easy to implement.

Another object of the present invention is to provide a system for acoustic echo cancellation, wherein a new nonparametric algorithm, which employs the MSE and the estimated system noise power to control the step-size update, is adopted such that the performance thereof would be increased.

In order to achieve the abovementioned first object of the present invention and other object of the present invention, a echo cancellation system is provided. The communication system comprises a speaker, a microphone, a convergence statistic generator, a variable step-size generator, a decision device, a adaptive weight control unit, a transversal filter, and a error signal generator. The speaker is used for outputting a acoustic signal. The microphone is used for receiving an input audio signal. The convergence statistic generator receives the input audio signal, the acoustic signal and a error signal to generate a convergence parameter. The variable step-size generator receives the error signal and the acoustic signal to generate a step size parameter in accordance the error signal and the acoustic signal. The decision device receives the convergence parameter and the step size parameter to output a adjusted step size parameter, wherein the adjusted step size parameter is equal to a boundary value when the convergence parameter is greater than a convergence threshold, wherein the adjusted step size parameter is equal to step size parameter when the convergence parameter is smaller than the convergence threshold. The adaptive weight control unit receives the acoustic signal, the adjusted step size parameter and the error signal to generate a coefficient vector. The transversal filter receives the input audio signal and the coefficient vector to generate the echo cancellation signal. The error signal generator receives the input audio signal and the echo cancellation signal to generate the error signal in accordance with the difference between the input audio signal and the echoless output signal.

In order to achieve the abovementioned second object of the present invention and other object of the present invention, a method for acoustic echo cancellation is provided. the method comprises the steps of: outputting a acoustic signal; receiving an input audio signal; generating a convergence parameter in accordance with the input audio signal, the acoustic signal and a error signal; generating a step size parameter in accordance the error signal and the acoustic signal; outputting a adjusted step size parameter, wherein the adjusted step size parameter is equal to a boundary value when the convergence parameter is greater than a convergence threshold, wherein the adjusted step size parameter is equal to the step size parameter when the convergence parameter is smaller than the convergence threshold; generating a coefficient vector in accordance with the acoustic signal, the adjusted step size parameter and the error signal; generating the echo cancellation signal in accordance with the input audio signal and the coefficient vector; and generating the error signal in accordance with the difference between the input audio signal and the echoless output signal.

In order to achieve the abovementioned second object of the present invention and other object of the present invention, a communication system, receiving a received signal from a channel represented as x(n), the communication system comprises a pilot signal generation unit, a convergence statistic generator, a variable step-size generator, a decision device, a adaptive weight control unit, a transversal filter, and a error signal generator. The pilot signal generation unit is used for outputting a pilot signal, which is represented as d(n). The convergence statistic generator receives the pilot signal, the received signal and a error signal for generating a convergence parameter. The variable step-size generator receives the error signal and the received signal for generating a step size parameter in accordance the error signal and the received signal. The decision device receives the convergence parameter and the step size parameter to output a adjusted step size parameter, wherein the adjusted step size parameter is equal to a boundary value when the convergence parameter is greater than a convergence threshold, wherein the adjusted step size parameter is equal to the step size parameter when the convergence parameter is smaller than the convergence threshold. The adaptive weight control unit receives the received signal, the adjusted step size parameter and the error signal to generate a coefficient vector. The transversal filter receives the received signal and the coefficient vector to generate a equalized signal. The error signal generator receives the pilot signal and the equalized signal to generate the error signal in accordance with the difference between the pilot signal and the equalized signal.

To sum up, the spirit of the present invention is to vary the step size parameter in accordance with the error signal and the output acoustic signal, wherein the filter is easy to implement, nonparametric VSS-NLMS algorithm which employs the mean-square error and the estimated system noise power to control the step-size update. The new nonparameteric VSS-NLMS algorithm has been shown to perform with fast convergence rate, good tracking, and low misadjustment. In comparison with existing VSS-NLMS algorithms, the proposed algorithm has demonstrated consistently superior performance both in convergence and for final error level relative to published algorithms in application on both simulated data and real speech data.

In order to further understand the techniques, means and effects of the present disclosure, the following detailed descriptions and appended drawings are hereby referred, such that, through which, the purposes, features and aspects of the present disclosure can be thoroughly and concretely appreciated; however, the appended drawings are merely provided for reference and illustration, without any intention to be used for limiting the present disclosure.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

FIG. 6 illustrates comparison to the theoretical MSE $\sigma_e^2(\infty)$ from (13) in accordance with the first embodiment of the present invention.

FIG. 8 illustrates the VSS algorithms in the same scenario as the previous example and their parameter settings in accordance with the first embodiment of the present invention.

DESCRIPTION OF THE EXEMPLARY EMBODIMENTS

Figure 1:
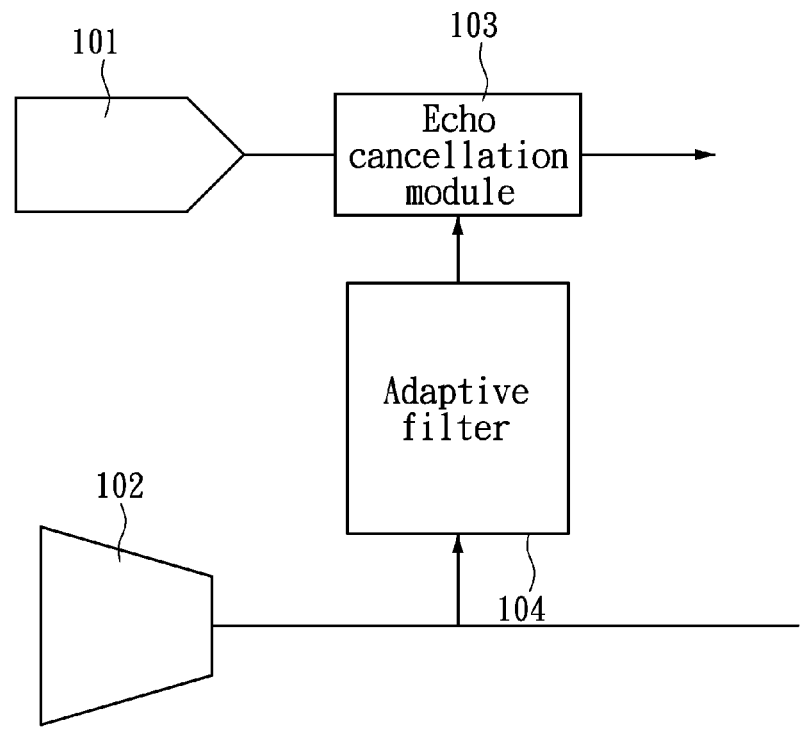
FIG. 1 illustrates a system block diagram depicting a system for acoustic echo cancellation in a conventional art.

Reference will now be made in detail to the exemplary embodiments of the present disclosure, examples of which are illustrated in the accompanying drawings. Wherever possible, the same reference numbers are used in the drawings and the description to refer to the same or like parts.

First Embodiment

Figure 2:
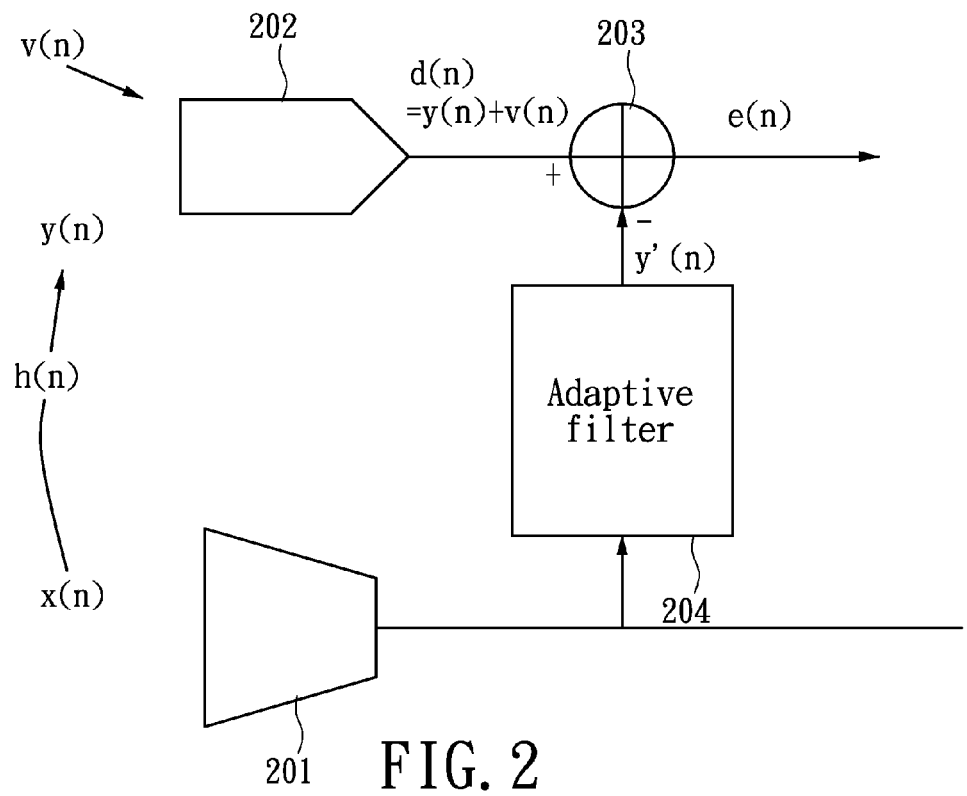
FIG. 2 illustrates a block diagram depicting an echo cancellation system in accordance with the first embodiment of the present invention.

FIG. 2 illustrates a block diagram depicting an echo cancellation system in accordance with the first embodiment of the present invention. Referring to FIG. 2, the echo cancellation system includes a speaker 201, a microphone 202, an error signal generator 203 and a adaptive filter 204. The speaker 201 is used for outputting an acoustic signal, which is represent as x(n). The microphone 202 is used for receiving an input audio signal, which is represent as d(n). The adaptive filter 204 receives the acoustic signal x(n) to generate a filtered signal, which is represented as y'(n). The error signal generator 203 receives the input audio signal d(n), the filtered signal y'(n) to generates an error signal, which is represented as e(n).

In order to conveniently describe the present invention, it is assumed that the error cancellation system is adopted by the mobile phone. Generally, a mobile phone has a functionality of loudspeaker. When the functionality of loudspeaker is on, the acoustic signal x(n) would be amplified and the amplified acoustic signal would be inputted to the microphone and the echo would be induced. It is assumed the echo is a unknown system, wherein its input signal is the acoustic signal x(n), its output signal is y(n), and its impulse response is h(n). Therefore, if the adaptive filter's impulse response is designed as h(n), the filtered signal y'(n) would be equal to y(n). As a result, the error signal would be the signal without the echo.

Figure 3:
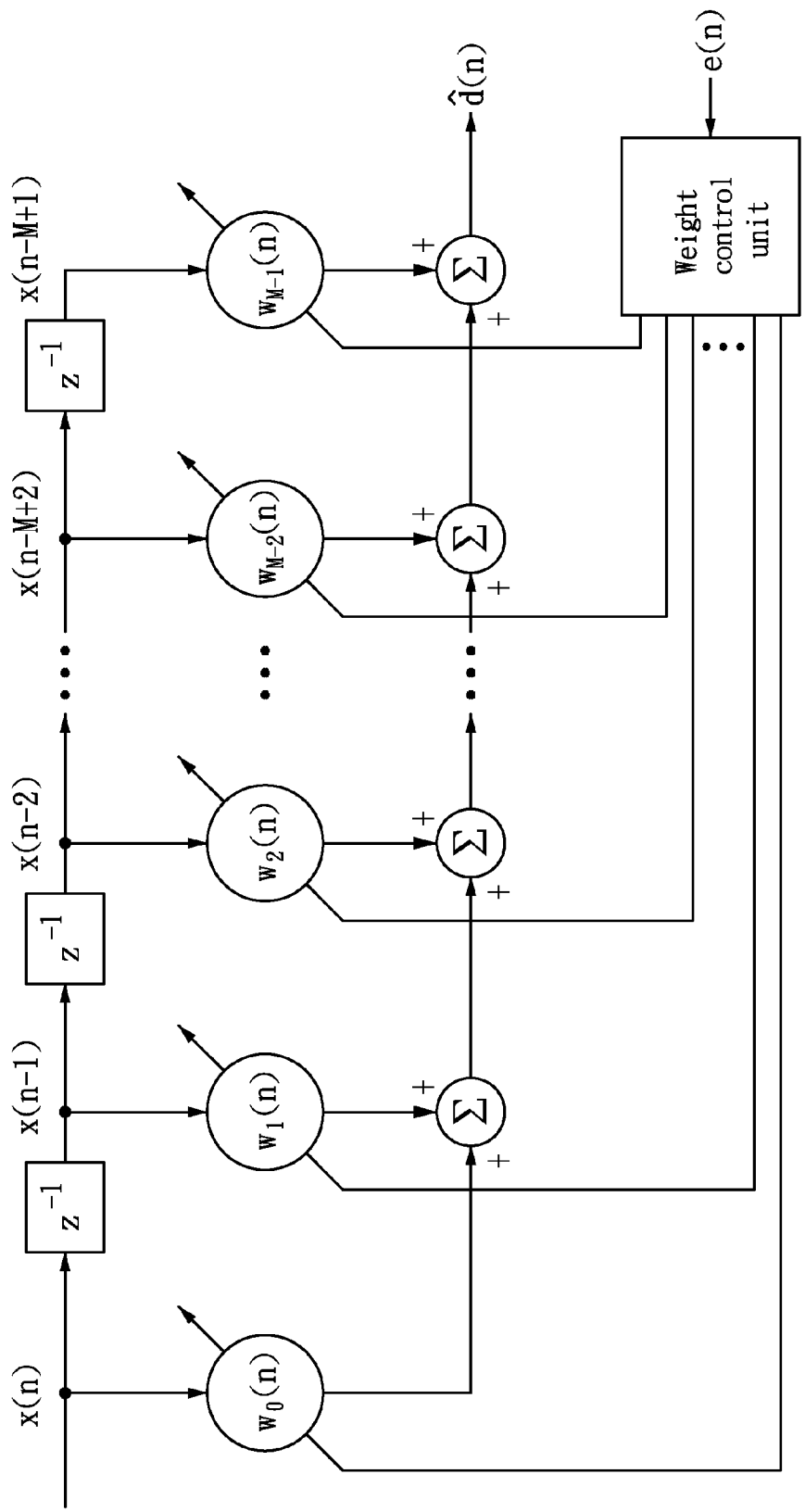
FIG. 3 illustrates a block diagram depicting a detail structure of the adaptive filter in accordance with the first embodiment of the present invention.

FIG. 3 illustrates a block diagram depicting a detail structure of the adaptive filter in accordance with the first embodiment of the present invention. Referring to FIG. 3, since the structure of the filter is a FIR filter, the detail description is omitted. In FIG. 3, the $w_0(n) \sim w_{M-1}(n)$ are the elements of the coefficient vector, wherein M is the length of the adaptive filter. One having ordinary skill in the art would know that the $w(n)=[w_0(n), \ldots, w_{M-1}(n)]$ is the impulse response of the adaptive filter. In order to let the impulse response of the adaptive filter being approximate to the echo's impulse response h(n), the $w_0(n) \sim w_{M-1}(n)$ would be adaptively adjusted as the error signal e(n) and the acoustic signal x(n).

Figure 4:
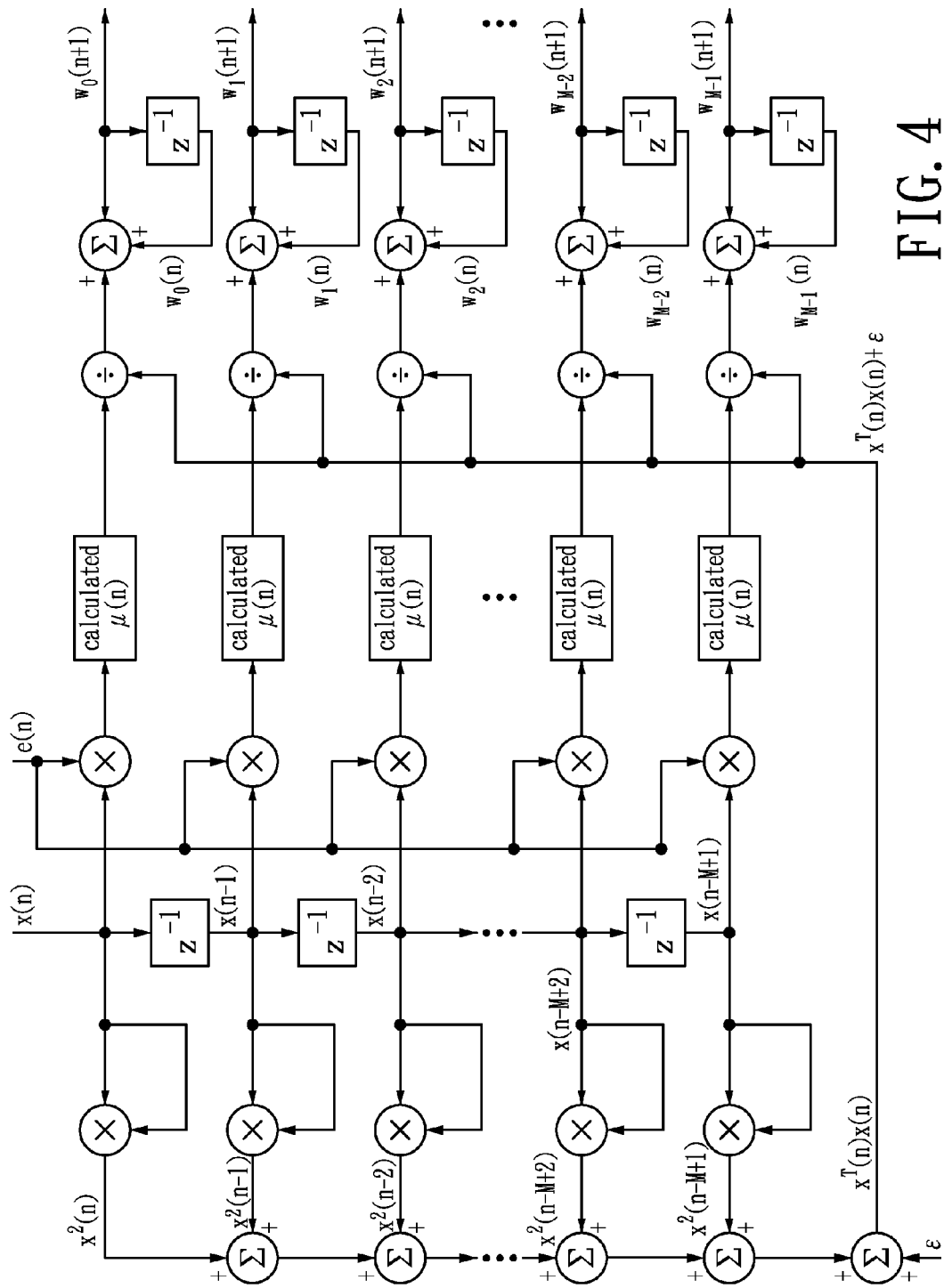
FIG. 4 illustrates a block diagram depicting a detailed structure of the adaptive weight control unit in accordance with the first embodiment of the present invention.

FIG. 4 illustrates a block diagram depicting a detailed structure of the adaptive weight control unit in accordance with the first embodiment of the present invention. Referring to FIG. 4, in order to simplify the description, the adaptive weight control unit can be represented as:

$$w(n+1) = w(n) + \frac{\mu(n)}{x^T(n)x(n) + \varepsilon} x(n)e(n), \quad (1)$$

wherein the $\varepsilon$ is a positive regulation parameter, and $\mu(n)$ is the step size parameter. In general, the value of the step size parameter $\mu(n)$ is between 0 and 2. In the equation (1), the greater the step size parameter $\mu(n)$ is, the higher speed convergence is, but stability is worse. If the step size parameter $\mu(n)$ is smaller, the steady state error will be lower. The problem is that the instantaneous error is contaminated by the disturbance noise such as the presence of near-end speech in hands-free communications. In this situation, instead of increasing step-size, one should either freeze the adaptation or use smaller step-size.

Figure 5:
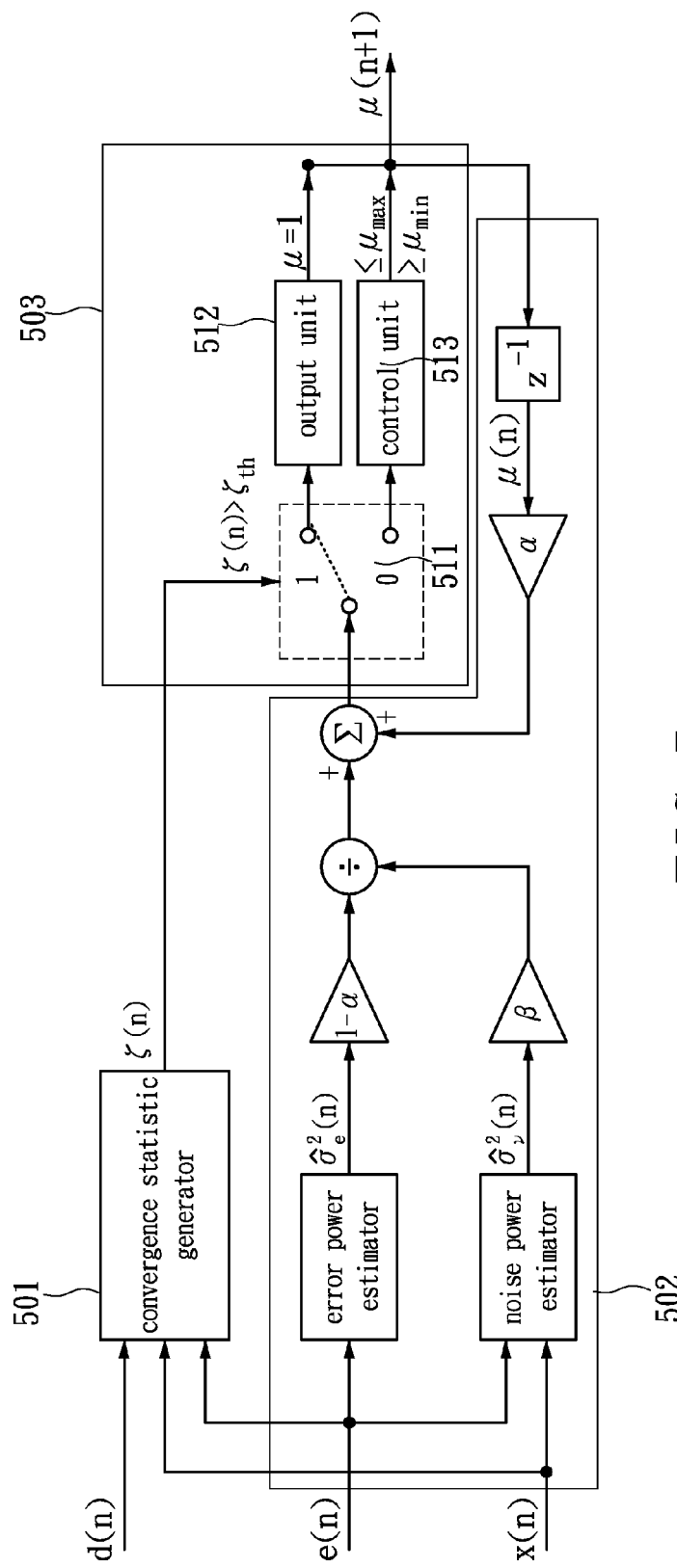
FIG. 5 illustrates a block diagram depicting a detailed structure of the variable step-size generator in accordance with the first embodiment of the present invention.

In order to mitigate this problem, we propose a variable step-size which can be used in the equation (1). FIG. 5 illustrates a block diagram depicting a detailed structure of the variable step-size generator in accordance with the first embodiment of the present invention. Referring to FIG. 5, the variable step-size generator includes a convergence statistic generator 501, a variable step-size generator 502, and a decision device 503. The convergence statistic generator 501 receives the input audio signal d(n), the acoustic signal x(n) and an error signal e(n) for generating a convergence parameter ζ. The variable step-size generator 502 receives the error signal e(n) and the acoustic signal x(n) for generating the step size parameter $\mu(n)$ in accordance the error signal e(n) and the acoustic signal x(n). The decision device 503 receives the convergence parameter ζ and the step size parameter $\mu(n)$ to output a adjusted step size parameter. The adjusted step size parameter is equal to a boundary value when the convergence parameter ζ is greater than a convergence threshold $\zeta_{th}$. The adjusted step size parameter is equal to the step size parameter $\mu(n)$ when the convergence parameter ζ is smaller than the convergence threshold $\zeta_{th}$.

The decision device 503 in the first embodiment further comprises a switching unit 511, a boundary value output unit 512 and a boundary value control unit 513. The switching unit 511 comprising a receiving terminal, a control terminal, a first input terminal and a second input terminal. The receiving terminal of the switching unit 511 receives the step size parameter $\mu(n)$. The control terminal of the switching unit 511 receives the convergence parameter ζ. The receiving terminal of the switching unit 511 is selectively coupled to the first input terminal if the convergence parameter ζ is greater than a convergence threshold $\zeta_{th}$, the receiving terminal of the switching unit 511 is selectively coupled to the second input terminal if the convergence parameter ζ is smaller than or equal to the convergence threshold $\zeta_{th}$.

The boundary value output unit 512 comprises an input terminal and an output terminal. The input terminal thereof is coupled to the first input terminal of the switching unit 511. When the input terminal of the boundary value output unit receives the step size parameter $\mu(n)$, the output terminal of the boundary value output unit 512 output the boundary value such that the decision device 503 uses the boundary value to be the adjusted step size parameter. The boundary value control unit 513 comprises an input terminal and an output terminal. The input terminal thereof is coupled to the second input terminal of the switching unit. When the input terminal thereof receives the step size parameter $\mu(n)$, the step size parameter $\mu(n)$ is determined and adjusted to be the adjusted step size parameter.

In the embodiment, we propose the new step size parameter $\mu(n)$ in the model with a new algorithm to vary the step-size. That is, $$\mu(n+1) = \alpha\mu(n) + \frac{(1-\alpha)\hat{\sigma}_e^2(n)}{\beta\hat{\sigma}_v^2(n)} \quad (2)$$

where β is a positive parameter that adds one freedom of design, the estimated MSE $\hat{\sigma}_e^2(n)$ and the system noise power $\hat{\sigma}_v^2(n)$ can be obtained recursively as:

$$\hat{\sigma}_e^2(n) = \alpha\hat{\sigma}_e^2(n-1) + (1-\alpha)e^2(n), \quad (3)$$

$$\hat{\sigma}_v^2(n) = \hat{\sigma}_e^2(n) - \frac{1}{\hat{\sigma}_x^2(n)} \hat{r}_{ex}(n)^T \hat{r}_{ex}(n), \quad (4)$$

In $\hat{r}_{ex}(n)$ denotes the cross-correlation between x(n) and e(n), and $\hat{\sigma}_x^2(n)$ is the input signal power. They can be estimated by $$\hat{\sigma}_x^2(n) = \alpha\hat{\sigma}_x^2(n-1) + (1-\alpha)x^2(n) \quad (5)$$

$$\hat{r}_{ex}(n) = \alpha\hat{r}_{ex}(n-1) + (1-\alpha)x(n)e(n) \quad (6)$$

The variable step-size generator 502 can be represented as the equation (2) to output the step size parameter $\mu(n)$. The step-size parameter $\mu(n)$ is variable. However, to guarantee the stability, we set a minimums value $\mu_{min}$ and a maximum value $\mu_{max}$, and the variable step-size $\mu(n)$ is bounded by $\mu_{min}$ and $\mu_{max}$. In practice, we can set $0 \leq \mu(n) \leq 2$, and the boundary control of the step-size parameter $\mu(n)$ is implement in the abovementioned boundary value control unit 513.

After some straightforward manipulations on equation (2), we get $$\mu(n) = \alpha^n \mu(0) + \frac{(1-\alpha)}{\beta} \sum_{i=1}^{n} \alpha^{n-i} \frac{\hat{\sigma}_e^2(i)}{\hat{\sigma}_v^2(i)} \quad (7)$$

Assuming the adaptive filter converges, it can be shown that $$E\{\mu(\infty)\} \approx \frac{1}{\beta} \frac{E\{\hat{\sigma}_e^2(\infty)\}}{\beta E\{\hat{\sigma}_v^2(\infty)\}} \triangleq \frac{1}{\beta} \frac{\sigma_e^2(\infty)}{\sigma_v^2}, \quad (8)$$

wherein $E\{\cdot\}$ denotes mathematical expectation, $\sigma_e^2(\infty)$ represents $E\{\hat{\sigma}_e^2(\infty)\}$, and $\sigma_v^2(n)$ is noise power.

In the early stage, $\sigma_e^2(n)$ is generally big due to the system mismatch, thus the adaptive filter uses a large $\mu(n)$. When the algorithm starts to converge, $\hat{\sigma}_e^2(n)$ becomes smaller, and $\mu(n)$ gets smaller. When the adaptive filter converges to the optimum solution, $\sigma_e^2(\infty)$ is pretty close to $\sigma_e^2(n)$, resulting in a constant step-size, $\mu(n) \approx 1/\beta$. The parameter $\beta$, which controls the mis-adjustment of the algorithm, will be investigated in the adjusted section. Note that the contribution of system noise to $\hat{\sigma}_e^2(n)$ is balanced as we utilize $\sigma_e^2(n)$ in (2). If system noise becomes larger or near-end speech occurs, $\mu(n)$ tends to decrease. This is exactly what we like to have in the scenario of acoustic echo cancellation.

In the embodiment, the decision device 503 provides another VSS-NLMS scheme which is to include the echo-path change detection statistic $\zeta(n)$ to our algorithm. The adjusted step-size is updated as $$\mu(n+1) = \begin{cases} \alpha\mu(n) + (1-\alpha)\frac{\hat{\sigma}_e^2(n)}{\beta\hat{\sigma}_v^2(n)}, & \text{if } \zeta(n) < \zeta_{th}, \\ 1, & \text{otherwise} \end{cases} \quad (9)$$

where $\zeta_{th}$ is a small positive quantity. The statistic $\zeta(n)$ is the convergence parameter and calculated in the convergence statistic generator 501. If the convergence parameter $\zeta$ is greater than a convergence threshold $\zeta_{th}$, the adjusted step size parameter is set to a boundary value, wherein the boundary value is for example equal to one.

In our algorithm, we provides three definitions of the statistic $\zeta(n)$ for implementation. The three definitions respectively represents $\zeta_1$, $\zeta_2$, and $\zeta_3$ the mathematic Forms of $\zeta_1$, $\zeta_2$, and $\zeta_3$ are described as below. The convergence parameter $\zeta_1(n)$ is represented as $$\zeta_1(n) = \frac{\hat{r}_{ex}(n)^T \hat{r}_{ex}(n)}{\hat{r}_{dx}(n)^T \hat{r}_{dx}(n) + c} \quad (10.1)$$

where $\hat{r}_{ex}(n)$ is a cross-correlation between the acoustic signal and the error signal, $\hat{r}_{dx}(n)$ is an estimate of $E\{x(n)d(n)\}$, $x(n)$ represents a vector of the acoustic signal.

The convergence parameter $\zeta_2(n)$ is represented as $$\zeta_2(n) = \left| \frac{\hat{\sigma}_e^2(n) - \hat{\sigma}_v^2(n)}{\hat{\sigma}_d^2(n) - \hat{\sigma}_v^2(n)} \right| \quad (10.2)$$

where $\hat{\sigma}_v^2(n)$ represents an energy of the noise signal, $\hat{\sigma}_e^2(n)$ represents an energy of the error signal, $\hat{\sigma}_d^2(n)$ represents an energy of the input audio signal.

The convergence parameter $\zeta_3(n)$ is represented as $$\zeta_3(n) = \left| \frac{\hat{r}_{de}(n) - \hat{\sigma}_e^2(n)}{\hat{\sigma}_d^2(n) - \hat{r}_{de}(n)} \right| \quad (10.3)$$

where $\hat{\sigma}_e^2(n)$ is an energy of the error signal, $\hat{\sigma}_d^2(n)$ is an energy of the input audio signal, $\hat{r}_{de}(n)$ is an estimate of $E\{d(n)e(n)\}$, wherein $E\{\cdot\}$ represents an expectation.

The steady-state MSE and the normalized steady-state squared norm of the system mismatch vector are derived in the following section relying heavily on the methods. The following assumptions are used to make the analysis tractable.

(1) The adaptive filter is operating in the system identification mode, and has the same structure as that of the unknown system.

(2) Input signal $x(n)$ and system noise $v(n)$ are zero-mean, jointly stationary random processes. Moreover, $v(n)$ is white and independent of $x(n)$.

(3) $x(n)$ and $d(n)$ are jointly Gaussian random processes.

(4) The filter coefficient vector $w(n)$ is independent of the input vector $x(n)$ and the desired response $d(n)$.

Let $\xi_{min}$ denote the minimum MSE at the filter output, and $\xi_{excess}$ represent the steady-state value of the excess MSE. Assuming the mis-adjustment is small (0.1 or less) and the regularization parameter $\epsilon$ is much smaller than $x^T(n) x(n)$, and employing the mis-adjustment result of a LMS algorithm, a conventional NLMS with a constant step-size $\mu_c$ can be shown to be $$\mathfrak{M} = \frac{\xi_{excess}}{\xi_{min}} \approx \frac{\mu_c}{2 - \mu_c}. \quad (10)$$

In the system identification mode, the step-size of our VSS-NLMS converges to $\mu(\infty) = \sigma_e^2(\infty)/\beta\sigma_v^2 = \sigma_e^2(\infty)/\beta\xi_{min}$, i.e., $\xi_{min} = \sigma_v^2$. Substituting $\mu_c = \sigma_e^2(\infty)/\beta\xi_{min}$ into (10), we can derive the excess MSE of the proposed VSS-NLMS as $$\xi_{excess} \approx \xi_{min} \frac{\sigma_e^2(\infty)}{2\beta\xi_{min} - \sigma_e^2(\infty)}. \quad (11)$$

Using excess $\xi_{excess} = \sigma_e^2(\infty) - \xi_{min}$, then (11) takes the form $$(\sigma_e^2(\infty))^2 - 2\beta\xi_{min}\sigma_e^2(\infty) + 2\beta(\xi_{min})^2 \approx 0. \quad (12)$$

Solving for $\sigma_e^2(\infty)$ of (12) and noting that the misadjustment is small, we have $$\sigma_e^2(\infty) \approx \xi_{min}(\beta - \sqrt{\beta^2 - 2\beta}), \beta > 2. \quad (13)$$

Finally, the misadjustment $\mathfrak{M}$ can be obtained as $$\mathfrak{M} \approx (\beta - 1) - \sqrt{\beta^2 - 2\beta}. \quad (13)$$

Note that the mis-adjustment is less than 0.1 for $\beta > 6.05$.

In the following description of the embodiment, we present simulation results to demonstrate the proposed VSS-NLMS as well as confirm the theoretical analysis presented earlier. The adaptive filter is used to identify an acoustic echo system $h(n)$ of length M. The impulse response of the system is normalized, i.e., $h^T(n) h(n) = 1$. The sampling rate is 8 kHz. The system noise is assumed to be a white, Gaussian process with zero mean. The parameter settings of our VSS-NLMS are $\alpha = 0.998$, $\epsilon = 0.1$, $\mu(0) = 1$, $\mu_{min} = 10^{-5}$, $\mu_{max} = 1$, and $\zeta_{th} = 0.35$. Results are ensemble averages over 200 independent runs.

This example confirmed the theoretical performance analysis presented in the previous section. Several cases are studied:

(1), $\beta = 30$ (the corresponding mis-adjustment is 0.018).

(2), Input signals $x(n)$: white input, AR(1) process, and MA(3) process with $\sigma_x^2 = 10$.

(3), System noise levels $\sigma_v^2 = 0.1$.

(4), Time-invariant systems of length M=64, 128, and 256. The experimental values were measured by time-averaging the ensemble average of the corresponding quantity over 8,000 time samples in the range [72,001, 80,000]. These are then compared to the theoretical MSE $\sigma_e^2(\infty)$ from (13). The results are presented in FIG. 6 for $\beta = 30$, ($\sigma_x^2 = 10$, $\sigma_v^2 = 0.1$). For the simulation presented in FIG. 6, the MSE agreement between simulation and theory is better than 0.3% in all cases, i.e., $|\sigma_e^2(\infty)-\hat{\sigma}_e^2(\infty)|/\sigma_e^2(\infty)<0.3\%$.

Figure 7:
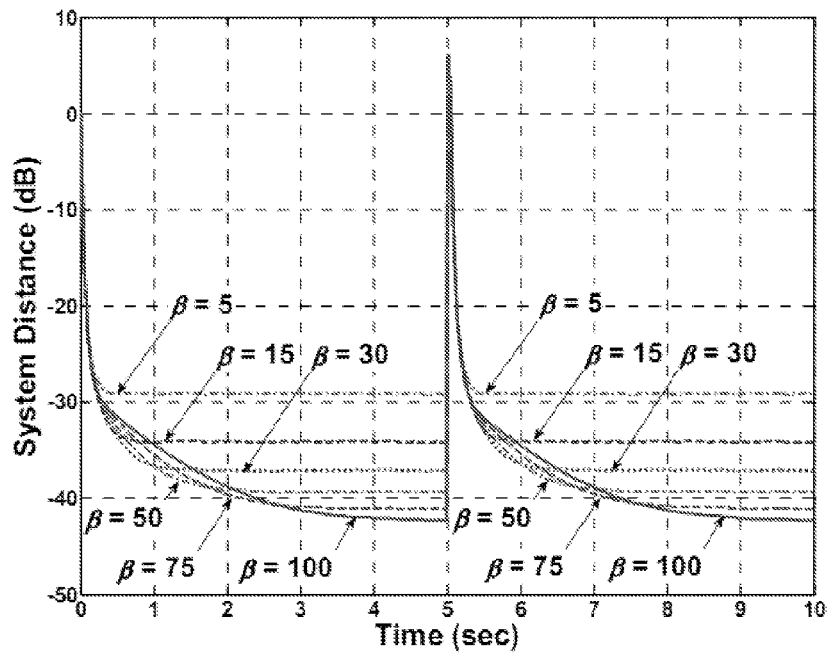
FIG. 7 illustrates the system distance curves (in dB) wherein the system noise has a power $\sigma_v^2=0.01$, in accordance with the first embodiment of the present invention.

The excess MSE of the proposed VSS-NLMS is controlled by β. We compare the behaviors of six different values of β (5, 15, 30, 50, 75, and 100). The acoustic echo system of length 128 changes signs at time 5 so that we can investigate the tracking performance of the filters. The input signal is a white Gaussian process with $\sigma_x^2=1$. The system noise has a power $\sigma_v^2=0.01$. The system distance curves (in dB) are presented in FIG. 7. Just as predicted, the algorithm with bigger β exhibits lower steady-state error. It is noted that the VSS-NLMS with β parameter in the range 30~50 has the advantages of both fast convergence rate and low steady-state error.

Figure 9:
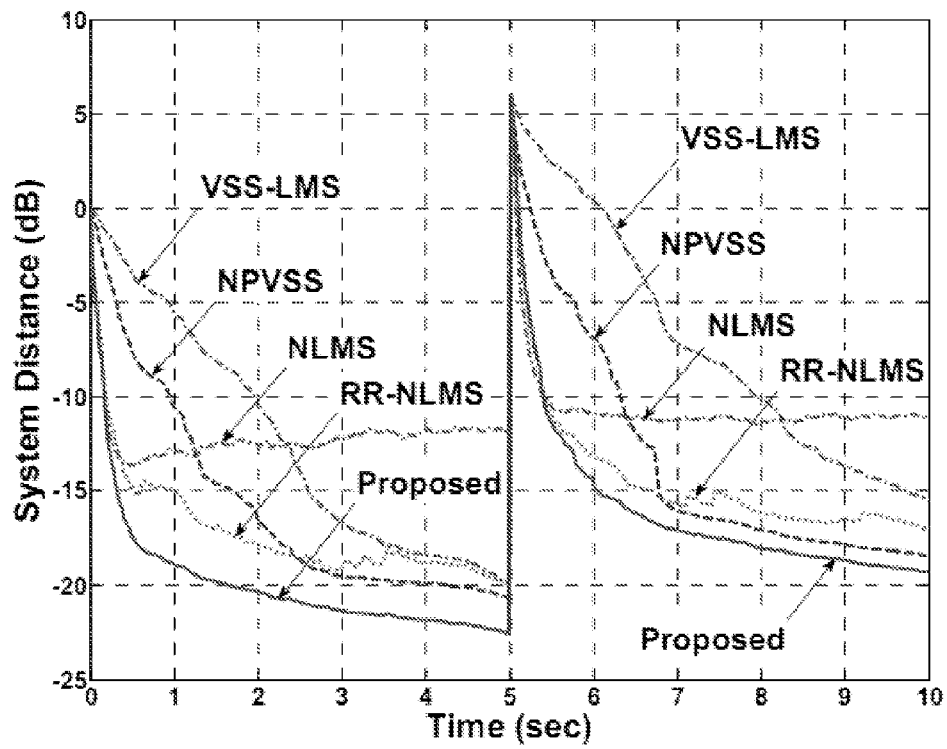
FIGS. 9 and 10 illustrate the simulation results in accordance with the first embodiment of the present invention.
Figure 10:
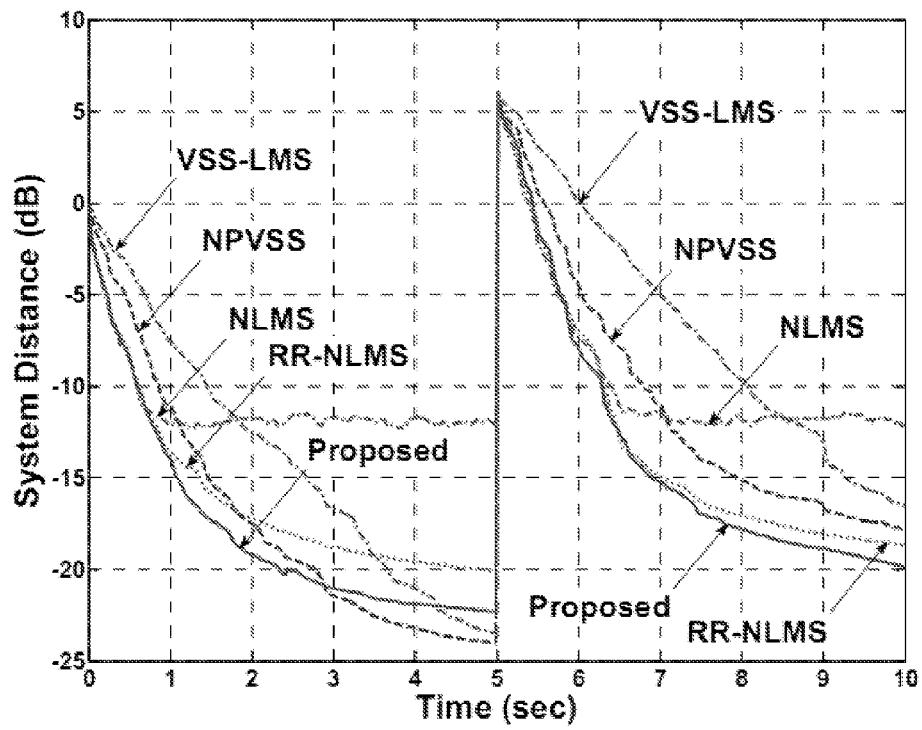

Firstly we evaluate these VSS algorithms in the same scenario as the previous example. The parameter settings are tabulated in FIG. 8. We compare the performance of these algorithms in analyzing real life speech signals. FIGS. 9 and 10 show the log of SD curves of male mandarin speech input, and female English speech input, respectively. The SD curves are averages over 20 independent runs, i.e., 20 different speech signals. The results for real speech are much less straightforward than for the simulated data. Considering first the male mandarin speaker (FIG. 9), the proposed algorithm is clearly superior for both convergence rate and final steady-state error. However, in the case of the female English (FIG. 10), for the first 5 seconds it seems to be a toss-up between the NPVSS algorithm and our new algorithm with our algorithm converging faster while the NPVSS has a lower error level. However, for the second interval, our algorithm outperforms the NPVSS on both counts.

The new non-parametric VSS-NLMS algorithm introduced in this embodiment of the present invention has been shown to perform with fast convergence rate, good tracking, and low mis-adjustment. In comparison with existing VSS-NLMS algorithms, the proposed algorithm has demonstrated consistently superior performance both in convergence and for final error level relative to published algorithms in application on both simulated data and real speech data.

Second Embodiment

Figure 11:
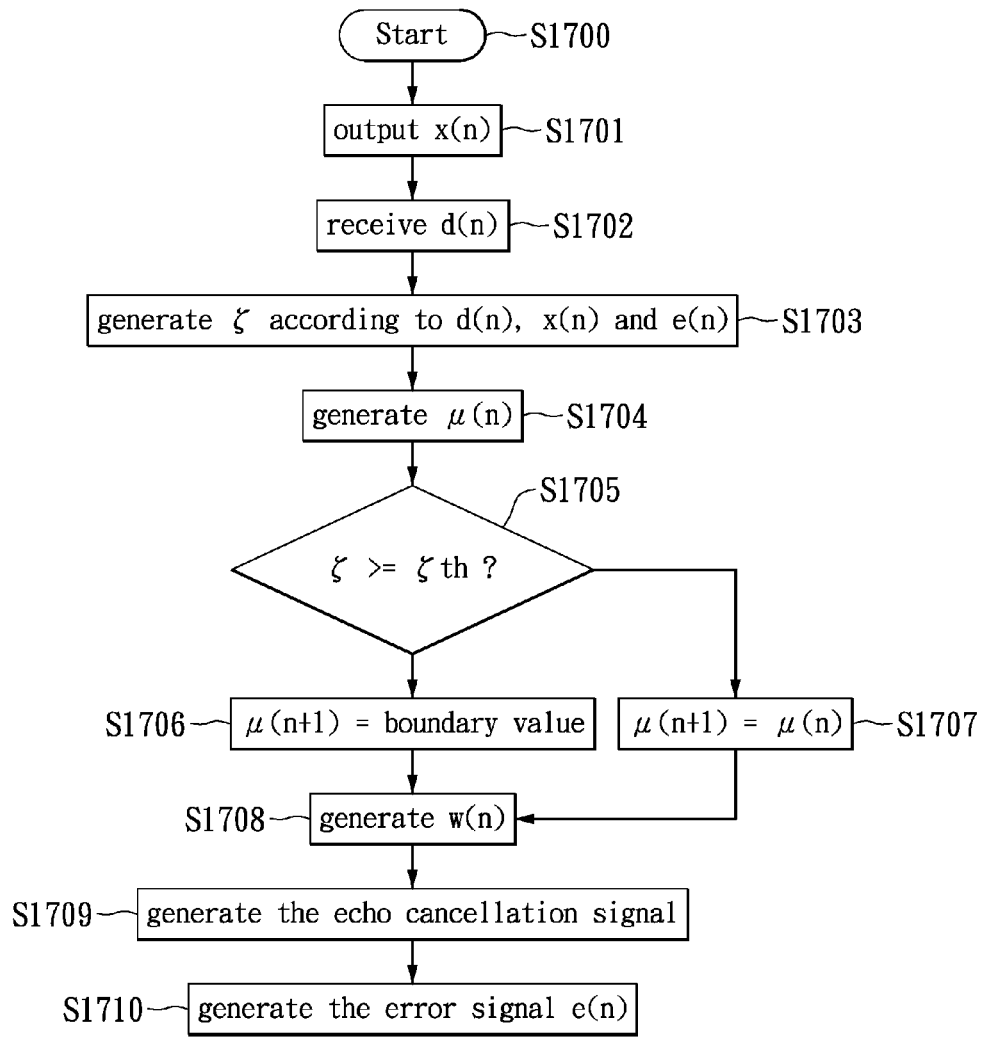
FIG. 11 illustrates the flow chart depicting the method for acoustic echo cancellation in accordance with the second embodiment of the present invention.

In accordance with the abovementioned first embodiment, a method for acoustic echo cancellation can be provided. FIG. 11 illustrates the flow chart depicting the method for acoustic echo cancellation in accordance with the second embodiment of the present invention. Referring to FIG. 11, the method includes the steps of:

In step S1701, an acoustic signal x(n) is outputted.

In step S1702, an input audio signal d(n) is received.

In step S1703, a convergence parameter ζ is generated in accordance with the input audio signal d(n), the acoustic signal x(n) and a error signal e(n). The convergence parameter could be generated as equation (10) for example such that the detail description is omitted.

In step S1704, a step size parameter μ(n) is generated in accordance the error signal and the acoustic signal. The step size parameter μ(n) could be generated as equation (2) for example such that the detail description is omitted.

In step S1705, it is determined whether the convergence parameter ζ is greater than or equal to a convergence threshold $\zeta_{th}$. If the convergence parameter ζ is greater than the convergence threshold $\zeta_{th}$, the step S1706 is performed. If the convergence parameter is smaller than the convergence threshold $\zeta_{th}$, the step S1707 is performed.

In step S1706, the adjusted step size parameter μ(n+1) is equal to a boundary value, such as 1.

In step S1707, the adjusted step size parameter μ(n+1) is equal to the step size parameter μ(n).

Although, the abovementioned embodiment is only provided a convergence parameter ζ and a convergence threshold $\zeta_{th}$, people having ordinary skill in the art may know that there is more than one convergence parameter ζ, such as previous equations (10.1), (10.2) and (10.3). Therefore, the present invention is not limited thereto.

In step S1708, a coefficient vector is generated in accordance with the acoustic signal, the adjusted step size parameter and the error signal. The detail description is shown in the first embodiment, so the description of the coefficient vector is omitted.

In step S1709, the echo cancellation signal is generated in accordance with the input audio signal and the coefficient vector.

In step S1710, the error signal is generated in accordance with the difference between the input audio signal and the echoless output signal.

Third Embodiment

Figure 12:
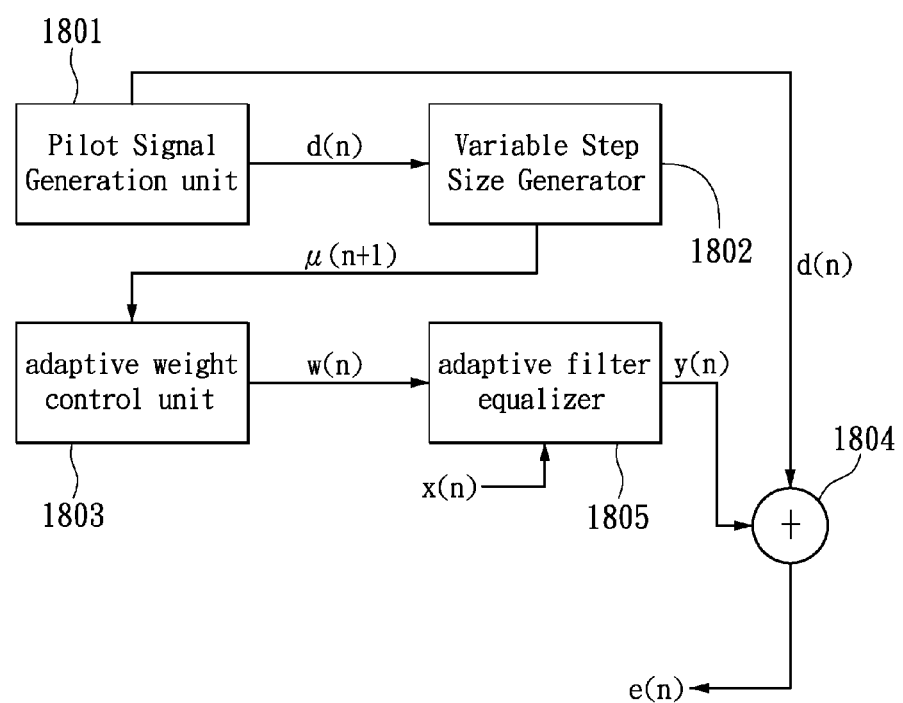
FIG. 12 illustrates a system block diagram depicting a communication system in accordance with the third embodiment of the present invention.

The abovementioned algorithm can not only be used for performing the echo cancellation, but applied for a communication system, such as an adaptive equalizer. FIG. 12 illustrates a system block diagram depicting a communication system in accordance with the third embodiment of the present invention. Referring to FIG. 12, the communication system includes a pilot signal generation unit 1801, a variable step size generator 1802, a adaptive weight control unit 1803, a error signal generator 1804 and a adaptive filter equalizer 1805. The pilot signal generation unit is used for outputting a pilot signal, which is represented as d(n). The variable step-size generator 1802 receiving the error signal, which is represent as e(n), and the received signal, which is represented as x(n) to generate an adjusted step size parameter μ(n+1) in accordance the error signal e(n) and the received signal x(n). The adaptive weight control unit 1803 receives the received signal x(n), the adjusted step size parameter μ(n+1) and the error signal e(n) to generate a coefficient vector w(n). The error signal generator receives the pilot signal d(n) and the equalized signal, which is represented as y(n), to generate the error signal e(n) in accordance with the difference between the pilot signal d(n) and the equalized signal y(n). The adaptive filter equalizer 1805 receives the received signal x(n) and the coefficient vector w(n) to generate a equalized signal y(n).

Similarly, the variable step size generator 1802 in FIG. 12 can be implemented as FIG. 5. In addition, the operation thereof is already stated as abovementioned embodiment such that the detail description is omitted. The adaptive weight control unit 1803 also can be implemented as FIG. 4 such that the detail description thereof is omitted.

In the abovementioned FIG. 12, the system is used for channel estimation. Because the channel could be seen as a unknown system which has a unknown impulse response, the impulse response of the adaptive filter equalizer 1805 in the embodiment would be close to the impulse response of the channel. Therefore, in the training period, the output equalized signal y(n) would be close to the ideal signal. In the following embodiment, the preferred implementation would be provided.

Figure 13:
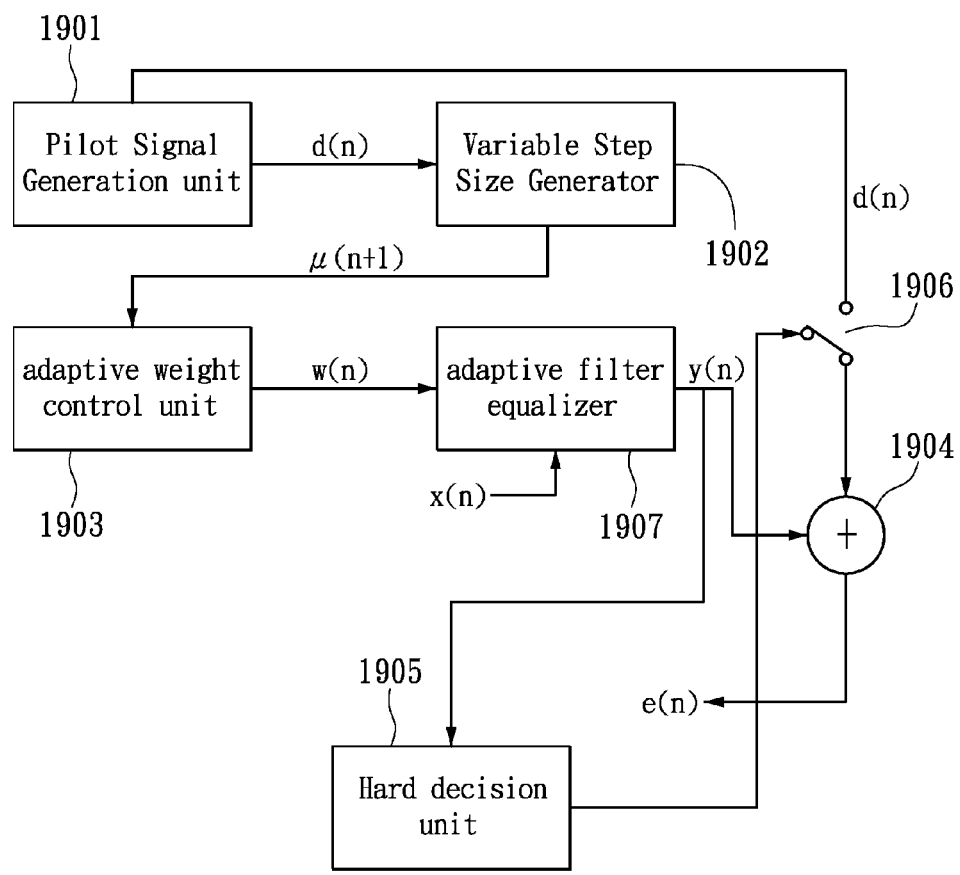
FIG. 13 illustrates a system block diagram depicting a communication system in accordance with FIG. 12 of the third embodiment of the present invention.

FIG. 13 illustrates a system block diagram depicting a communication system in accordance with FIG. 12 of the third embodiment of the present invention. Referring to FIG. 13, the communication system includes a pilot signal generation unit 1901, a variable step size generator 1902, a adaptive weight control unit 1903, a error signal generator 1904, a hard decision unit 1905, a switching unit 1906 and a adaptive filter equalizer 1907. Since the functions of the pilot signal generation unit 1901, the variable step size generator 1902, the adaptive weight control unit 1903, the error signal generator 1904, and the adaptive filter equalizer 1907 has been already described such that the detail description is omitted. In the training period, the impulse response of the adaptive filter equalizer 1907 would be similar to the impulse response of the channel. After the training period, the communication system would enter the tracking mode.

In the training period, the terminal U1 of the switching unit 1906 is electrically connected to the terminal U2 of the switching unit 1906 and the terminal U1 of the switching unit 1906 is electrically disconnected to the terminal U3 of the switching unit 1906. The error signal generator 1904 receives the pilot signal d(n) so that the impulse response of the adaptive filter equalizer 1907 can be close to the impulse response of the channel. In the tracking mode, the terminal U1 of the switching unit 1906 is electrically connected to the terminal U3 of the switching unit 1906 and the terminal U1 of the switching unit 1906 is electrically disconnected to the terminal U2 of the switching unit 1906. The hard decision unit 1905 receives the equalized signal y(n) for performing a hard decision to an equalized signal y(n) to obtain a decision signal d'(n). Since the impulse response of the adaptive filter equalizer is close to the impulse response of the channel, the noise, especially the Inter Symbol Interference (ISI), can be eliminated.

In summary, the spirit of the present invention is to provide a variable step size parameter in accordance with the error signal and the output acoustic signal, wherein the filter is easy to implement, nonparametric VSS-NLMS algorithm which employs the mean-square error and the estimated system noise power to control the step-size update. The new nonparametric VSS-NLMS algorithm has been shown to perform with fast convergence rate, good tracking, and low mis-adjustment. In comparison with existing VSS-NLMS algorithms, the proposed algorithm has demonstrated consistently superior performance both in convergence and for final error level relative to published algorithms in application on both simulated data and real speech data.

The above-mentioned descriptions represent merely the exemplary embodiment of the present disclosure, without any intention to limit the scope of the present disclosure thereto. Various equivalent changes, alternations or modifications based on the claims of present disclosure are all consequently viewed as being embraced by the scope of the present disclosure.

What is claimed is:

1. An echo cancellation system, comprising:
    a speaker, for outputting a acoustic signal, which is represented as x(n);
    a microphone, for receiving an input audio signal, which is represented as d(n);
    a convergence statistic generator, receiving the input audio signal, the acoustic signal and a error signal, for generating a convergence parameter;
    a variable step-size generator, receiving the error signal and the acoustic signal, for generating a step size parameter in accordance the error signal and the acoustic signal;
    a decision device, receiving the convergence parameter and the step size parameter to output a adjusted step size parameter, wherein the adjusted step size parameter is equal to a boundary value when the convergence parameter is greater than a convergence threshold, wherein the adjusted step size parameter is equal to the step size parameter when the convergence parameter is smaller than the convergence threshold;
    an adaptive weight control unit, receiving the acoustic signal, the adjusted step size parameter and the error signal to generate a coefficient vector;
    a transversal filter, receiving the acoustic signal and the coefficient vector to generate an echo cancellation signal; and
    an error signal generator, receiving the input audio signal and the echo cancellation signal to generate the error signal in accordance with the difference between the input audio signal and the echoless output signal;
    wherein the variable step-size generator comprises:
        an error power computing unit, receiving the error signal, for calculating an energy of the error signal, and generating an error power signal, which is represented as $\hat{\sigma}_e^2(n)$, wherein n is a time index;
    wherein the error signal is represented as e(n), the calculation of the error power signal $\hat{\sigma}_e^2(n)$ comprises:

$$\hat{\sigma}_e^2(n) = \alpha \hat{\sigma}_e^2(n-1) + (1-\alpha)e^2(n),$$

wherein, $\alpha$ is a smoothing factor;
    wherein the input audio signal comprises a noise signal, the variable step-size generator comprises:
        a noise power estimator, receiving the error signal and the acoustic signal for estimating the noise signal and calculating an energy of the noise signal to output a noise power signal, which is represented as $\hat{\sigma}_v^2(n)$;
    wherein the step size parameter represents $\mu(n+1)$, wherein n is time index, and the variable step-size generator comprises:
        a first multiplier, for multiplying the error power signal $\hat{\sigma}_e^2(n)$ and $(1-\alpha)$ to obtain $(1-\alpha)\hat{\sigma}_e^2$;
        a second multiplier, for multiplying the noise power signal $\hat{\sigma}_v^2(n)$ and $\beta$ to obtain $\beta\hat{\sigma}_v^2$;
        a divider, for dividing $(1-\alpha)\hat{\sigma}_e^2(n)$ by $\beta\hat{\sigma}_v^2(n)$ to obtain $(1-\alpha)\hat{\sigma}_e^2(n)/\beta\hat{\sigma}_v^2(n)$;
        a delay element, for delaying the adjusted step size parameter $\mu(n+1)$ a unit of time to obtain $\mu(n)$;
        a third multiplier, for multiplying the $\mu(n)$ and $\alpha$ to obtain $\alpha\mu(n)$;
        an adder, for adding $(1-\alpha)\hat{\sigma}_e^2(n)/\beta\hat{\sigma}_v^2(n)$ and $\alpha\mu(n)$ to obtain the step size parameter $\mu(n+1)$, which is represented as:

$$\mu(n+1) = \alpha\mu(n) + (1-\alpha)\hat{\sigma}_e^2(n)/\beta\hat{\sigma}_v^2(n),$$

wherein n is time index, $\alpha$ is forgetting factor, $\beta$ is beta parameter, wherein $\beta > 0$.

2. The echo cancellation system according to claim 1, wherein the calculation of the noise power signal $\hat{\sigma}_v^2(n)$ comprises:

$$\hat{\sigma}_v^2(n) = \hat{\sigma}_e^2(n) - \frac{1}{\hat{\sigma}_x^2(n)} \hat{r}_{ex}(n)^T \hat{r}_{ex}(n),$$

wherein, $$\hat{\sigma}_x^2(n) = \alpha\hat{\sigma}_x^2(n) + (1-\alpha)x^2(n)$$

$$\hat{r}_{ex}(n) = \alpha\hat{r}_{ex}(n-1) + (1-\alpha)x(n)e(n)$$

$\hat{r}_{ex}(n)$ is a cross-correlation between the acoustic signal and the error signal, $\hat{\sigma}_x^2(n)$ is power of the acoustic signal, T represents an operation of transposition of a matrix, x(n) represents the acoustic signal, x(n) represents a vector of the acoustic signal.

3. The echo cancellation system according to claim 1, wherein the input audio signal is represented as d(n), the convergence parameter is represented as $\zeta_1(n)$, wherein $$\zeta_1(n) = \frac{\hat{r}_{ex}(n)^T \hat{r}_{ex}(n)}{\hat{r}_{dx}(n)^T \hat{r}_{dx}(n) + c}$$

$\hat{r}_{ex}(n)$ is a cross-correlation between the acoustic signal and the error signal, $\hat{r}_{dx}(n)$ is an estimate of $E\{x(n)d(n)\}$, wherein $E\{\bullet\}$ represents an expectation, x(n) represents a vector of the acoustic signal, T represents an operation of transposition of a matrix.

4. The echo cancellation system according to claim 1, wherein the convergence parameter is represented as $\zeta_2(n)$, wherein $$\zeta_2(n) = \left| \frac{\hat{\sigma}_e^2(n) - \hat{\sigma}_v^2(n)}{\hat{\sigma}_d^2(n) - \hat{\sigma}_v^2(n)} \right|$$

$\hat{\sigma}_v^2(n)$ represents an energy of the noise signal, $\hat{\sigma}_e^2(n)$ represents an energy of the error signal, $\hat{\sigma}_d^2(n)$ represents an energy of the input audio signal.

5. The echo cancellation system according to claim 1, wherein the error signal is represented as e(n), the input audio signal is represented as d(n), the convergence parameter is represented as $\zeta_3(n)$, wherein $$\zeta_3(n) = \left| \frac{\hat{r}_{de}(n) - \hat{\sigma}_e^2(n)}{\hat{\sigma}_d^2(n) - \hat{r}_{de}(n)} \right|,$$

wherein $\hat{\sigma}_e^2(n)$ is an energy of the error signal, $\hat{\sigma}_d^2(n)$ is an energy of the input audio signal, $\hat{r}_{de}(n)$ is an estimate of $E\{d(n)e(n)\}$, wherein $E\{\bullet\}$ represents an expectation.

6. The echo cancellation system according to claim 1, wherein the decision device comprises:
   a switching unit, comprising a receiving terminal, a control terminal, a first input terminal and a second input terminal, wherein the receiving terminal receives the step size parameter, the control terminal receives the convergence parameter, wherein the receiving terminal of the switching unit is selectively coupled to the first input terminal when the convergence parameter is greater than a convergence threshold, the receiving terminal of the switching unit is selectively coupled to the second input terminal when the convergence parameter is smaller than or equal to the convergence threshold;
   a boundary value output unit, comprising an input terminal and an output terminal, wherein the input terminal thereof is coupled to the first input terminal of the switching unit, wherein when the input terminal of the boundary value output unit receives the step size parameter, the output terminal of the boundary value output unit output the boundary value such that the decision device uses the boundary value to be the adjusted step size parameter; and
   a boundary value control unit, comprising an input terminal and an output terminal, wherein the input terminal thereof is coupled to the second input terminal of the switching unit, wherein, when the input terminal thereof receives the step size parameter, the step size parameter is determined and adjusted to be the adjusted step size parameter.

7. The echo cancellation system according to claim 6, wherein when the boundary value control unit determines that the received step size parameter is greater than or equal to a maximum step size boundary, the output terminal of the boundary value control unit outputs the maximum step size boundary, when the boundary value control unit determines that the received step size parameter is smaller than a minimum step size boundary, the output terminal of the boundary value control unit outputs the minimum step size boundary, when the boundary value control unit determines that the received step size parameter is between the maximum step size boundary and the minimum step size boundary, the output terminal of the boundary value control unit outputs the received step size parameter.

8. The echo cancellation system according to claim 1, wherein the acoustic signal is represented as x(n), the adjusted step size parameter is represented as $\mu(n)$, the error signal is represented as e(n), the coefficient vector is $$w(n+1) = w(n) + \frac{\mu(n)}{x^T(n)x(n) + \varepsilon} x(n)e(n),$$

wherein the $\epsilon$ is a positive regulation parameter.

9. A method for acoustic echo cancellation, comprising:
   outputting a acoustic signal;
   receiving an input audio signal;
   generating a convergence parameter in accordance with the input audio signal, the acoustic signal and a error signal;
   generating a step size parameter in accordance the error signal and the acoustic signal;
   outputting a adjusted step size parameter, wherein the adjusted step size parameter is equal to a boundary value when the convergence parameter is greater than a convergence threshold, wherein the adjusted step size parameter is equal to the step size parameter when the convergence parameter is smaller than the convergence threshold;
   generating a coefficient vector in accordance with the acoustic signal, the adjusted step size parameter and the error signal;
   generating the echo cancellation signal in accordance with the input audio signal and the coefficient vector; and
   generating the error signal in accordance with the difference between the input audio signal and the echoless output signal;
   wherein the input audio signal comprises a noise signal, the step of generating a step size parameter in accordance the error signal and the acoustic signal comprises:
      calculating an energy of the error signal, and generating an error power signal, which is represented as $\hat{\sigma}_e^2(n)$, wherein n is a time index;
      estimating a noise signal and calculating an energy of the noise signal to output a noise power signal, which is represented as $\hat{\sigma}_v^2(n)$;
   wherein the error signal is represented as e(n), the calculation of the error power signal $\hat{\sigma}_e^2(n)$ comprises:
   $\hat{\sigma}_e^2(n) = \alpha\hat{\sigma}_e^2(n-1) + (1-\alpha)e^2(n),$
   wherein, $\alpha$ is a smoothing factor;
   wherein the calculation of the noise power signal $\hat{\sigma}_v^2(n)$ comprises:

$$\hat{\sigma}_v^2(n) = \hat{\sigma}_e^2(n) - \frac{1}{\hat{\sigma}_x^2(n)} \hat{r}_{ex}(n)^T \hat{r}_{ex}(n),$$

wherein, $$\hat{\sigma}_x^2(n) = \alpha\hat{\sigma}_x^2(n) + (1-\alpha)x^2(n)$$

$$\hat{r}_{ex}(n) = \alpha\hat{r}_{ex}(n-1) + (1-\alpha)x(n)e(n)$$

$\hat{r}_{ex}(n)$ is a cross-correlation between the acoustic signal and the error signal, $\hat{\sigma}_x^2(n)$ is power of the acoustic signal, T represents an operation of transposition of a matrix, x(n) represents the acoustic signal, x(n) represents a vector of the acoustic signal;

wherein the step of generating a step size parameter in accordance the error signal and the acoustic signal further comprises:

multiplying the error power signal $\hat{\sigma}_e^2(n)$ and $(1-\alpha)$ to obtain $(1-\alpha)\hat{\sigma}_e^2$;

multiplying the noise power signal $\hat{\sigma}_v^2(n)$ and $\beta$ to obtain $\beta\hat{\sigma}_v^2$;

dividing $(1-\alpha)\hat{\sigma}_e^2(n)$ by $\beta\hat{\sigma}_v^2(n)$ to obtain $(1-\alpha)\hat{\sigma}_e^2(n)/\beta\hat{\sigma}_v^2(n)$;

delaying the adjusted step size parameter a unit of time to obtain $\mu(n)$;

multiplying the $\mu(n)$ and $\alpha$ to obtain $\alpha\mu(n)$;

adding $(1-\alpha)\hat{\sigma}_e^2(n)/\beta\hat{\sigma}_v^2(n)$ and $\alpha\mu(n)$ to obtain the adjusted step size parameter $\mu(n+1)$, which is represented as:

$$\mu(n+1) = \alpha\mu(n) + (1-\alpha)\hat{\sigma}_e^2(n)/\beta\hat{\sigma}_v^2(n),$$

wherein n is time index, $\alpha$ is forgetting factor, $\beta$ is beta parameter, wherein $\beta>0$.

10. The method for acoustic echo cancellation according to claim 9, wherein the input audio signal is represented as d(n), the convergence parameter is represented as $\zeta_1(n)$, wherein $$\zeta_1(n) = \frac{\hat{r}_{ex}(n)^T \hat{r}_{ex}(n)}{\hat{r}_{dx}(n)^T \hat{r}_{dx}(n) + c}$$

$\hat{r}_{ex}(n)$ is a cross-correlation between the acoustic signal and the error signal, $\hat{r}_{dx}(n)$ is an estimate of $E\{x(n)d(n)\}$, wherein $E\{\bullet\}$ represents an expectation, x(n) represents a vector of the acoustic signal, T represents an operation of transposition of a matrix.

11. The method for acoustic echo cancellation according to claim 9, wherein the convergence parameter is represented as $\zeta_2(n)$, wherein $$\zeta_2(n) = \left|\frac{\hat{\sigma}_e^2(n) - \hat{\sigma}_v^2(n)}{\hat{\sigma}_d^2(n) - \hat{\sigma}_v^2(n)}\right|$$

$\hat{\sigma}_v^2(n)$ represents an energy of the noise signal, $\hat{\sigma}_e^2(n)$ represents an energy of the error signal, $\hat{\sigma}_d^2(n)$ represents an energy of the input audio signal.

12. The method for acoustic echo cancellation according to claim 9, wherein the error signal is represented as e(n), the input audio signal is represented as d(n), the convergence parameter is represented as $\zeta_3(n)$, wherein $$\zeta_3(n) = \left|\frac{\hat{r}_{de}(n) - \hat{\sigma}_e^2(n)}{\hat{\sigma}_d^2(n) - \hat{r}_{de}(n)}\right|,$$

wherein $\hat{\sigma}_e^2(n)$ is an energy of the error signal, $\hat{\sigma}_d^2(n)$ is an energy of the input audio signal, $\hat{r}_{de}(n)$ is an estimate of $E\{d(n)e(n)\}$, wherein $E\{\bullet\}$ represents an expectation.

13. The method for acoustic echo cancellation according to claim 9, wherein the acoustic signal is represented as x(n), the adjusted step size parameter is represented as $\mu(n)$, the error signal is represented as e(n), the coefficient vector is $$w(n+1) = w(n) + \frac{\mu(n)}{x^T(n)x(n) + \varepsilon}x(n)e(n),$$

wherein the $\epsilon$ is a positive regulation parameter.

14. The method for acoustic echo cancellation according to claim 9, wherein, when the convergence parameter is smaller than the convergence threshold, the step of outputting the adjusted step size parameter comprises:

determining whether the step size parameter is between a maximum step size boundary and a minimum step size boundary;

outputting the step size parameter to be the adjusted step size parameter when the step size parameter is between a maximum step size boundary and a minimum step size boundary;

outputting the maximum step size boundary to be the adjusted step size parameter when the step size parameter is greater than the maximum step size boundary; and outputting the minimum step size boundary to be the adjusted step size parameter when the step size parameter is smaller than the minimum step size boundary.

15. A communication system, receiving a received signal from a channel represented as x(n), the communication system comprising:

a pilot signal generation unit, for outputting a pilot signal, which is represented as d(n);

a convergence statistic generator, receiving the pilot signal, the received signal and a error signal, for generating a convergence parameter;

a variable step-size generator, receiving the error signal and the received signal, for generating a step size parameter in accordance the error signal and the received signal;

a decision device, receiving the convergence parameter and the step size parameter to output a adjusted step size parameter, wherein the adjusted step size parameter is equal to a boundary value when the convergence parameter is greater than a convergence threshold, wherein the adjusted step size parameter is equal to the step size parameter when the convergence parameter is smaller than the convergence threshold;

an adaptive weight control unit, receiving the received signal, the adjusted step size parameter and the error signal to generate a coefficient vector;

a transversal filter, receiving the received signal and the coefficient vector to generate a equalized signal; and an error signal generator, receiving the pilot signal and the equalized signal to generate the error signal in accordance with the difference between the pilot signal and the equalized signal;

wherein the variable step-size generator comprises:

an error power computing unit, receiving the error signal, for calculating an energy of the error signal, and generating an error power signal, which is represented as $\hat{\sigma}_e^2(n)$, wherein n is a time index;

wherein the error signal is represented as e(n), the calculation of the error power signal $\hat{\sigma}_e^2(n)$ comprises:

$$\hat{\sigma}_e^2(n) = \alpha\hat{\sigma}_e^2(n-1) + (1-\alpha)e^2(n),$$

wherein, $\alpha$ is a smoothing factor wherein the received signal comprises a noise signal, the variable step-size generator comprises:
a noise power estimator, receiving the error signal and the received signal for estimating the noise signal and calculating an energy of the noise signal to output a noise power signal, which is represented as $\hat{\sigma}_v^2(n)$
wherein the step size parameter represents μ(n+1), wherein n is time index, and the variable step-size generator comprises:
a first multiplier, for multiplying the error power signal $\hat{\sigma}_e^2(n)$ and (1−α) to obtain $(1-\alpha)\hat{\sigma}_e^2$;
a second multiplier, for multiplying the noise power signal $\hat{\sigma}_v^1(n)$ and β to obtain $\beta\hat{\sigma}_v^2$;
a divider, for dividing $(1-\alpha)\hat{\sigma}_e^2(n)$ by $\beta\hat{\sigma}_v^2(n)$ to obtain $(1-\alpha)\hat{\sigma}_e^2(n)/\beta\hat{\sigma}_v^2(n)$;
a delay element, for delaying the adjusted step size parameter μ(n+1) a unit of time to obtain the step size parameter μ(n);
a third multiplier, for multiplying the step size parameter μ(n) and α to obtain αμ(n);
an adder, for adding $(1-\alpha)\hat{\sigma}_e^2(n)/\beta\hat{\sigma}_v^2(n)$ and αμ(n) to obtain the adjusted step size parameter μ(n+1), which is represented as:

$$\mu(n+1)=\alpha\mu(n)+(1-\alpha)\hat{\sigma}_e^2(n)/\beta\hat{\sigma}_v^2(n),$$

wherein n is time index, α is forgetting factor, β is beta parameter, wherein β>0.

16. The communication system according to claim 15, wherein the pilot signal generation unit comprises:
a delay unit, for delaying a training sequence for a preset time to obtain a pilot signal.

17. The communication system according to claim 15, further comprising:
a hard decision unit, for performing a hard decision to an equalized signal to obtain a decision signal;
a switching unit, comprising a first terminal, a second terminal and a third terminal, wherein the first terminal thereof is coupled to the pilot signal generation unit, the second terminal thereof is coupled to the hard decision unit and the third terminal thereof is coupled to the error signal generator;
wherein the first terminal thereof is electrically connected to the third terminal thereof and the second terminal thereof is electrically disconnected to the third terminal thereof when it is in a training period such that the pilot signal is transmitted to the error signal generator, when it is in a receiving period, the second terminal thereof is electrically connected to the third terminal thereof and the first terminal thereof is electrically disconnected to the third terminal thereof such that the decision signal is transmitted to the error signal generator.

18. The communication system according to claim 15, wherein the calculation of the noise power signal $\hat{\sigma}_v^2(n)$ comprises:

$$\hat{\sigma}_v^2(n) = \hat{\sigma}_e^2(n) - \frac{1}{\hat{\sigma}_x^2(n)}\hat{r}_{ex}(n)^T\hat{r}_{ex}(n),$$

wherein, $$\hat{\sigma}_x^2(n)=\alpha\hat{\sigma}_x^2(n)+(1-\alpha)x^2(n)$$

$$\hat{r}_{ex}(n)=\alpha\hat{r}_{ex}(n-1)+(1-\alpha)x(n)e(n)$$

$\hat{r}_{ex}(n)$ is a cross-correlation between the received signal and the error signal, $\hat{\sigma}_x^1(n)$ is power of the received signal, T represents an operation of transposition of a matrix, x(n) represents the received signal, x(n) represents a vector of the received signal.

19. The communication system according to claim 15, wherein the decision device comprises:
A switching unit, comprising a receiving terminal, a control terminal, a first input terminal and a second input terminal, wherein the receiving terminal receives the step size parameter, the control terminal receives the convergence parameter, wherein the receiving terminal of the switching unit is selectively coupled to the first input terminal when the convergence parameter is greater than a convergence threshold, the receiving terminal of the switching unit is selectively coupled to the second input terminal when the convergence parameter is smaller than or equal to the convergence threshold;
a boundary value output unit, comprising an input terminal and an output terminal, wherein the input terminal thereof is coupled to the first input terminal of the switching unit, wherein when the input terminal of the boundary value output unit receives the step size parameter, the output terminal of the boundary value output unit output the boundary value such that the decision device uses the boundary value to be the adjusted step size parameter; and
a boundary value control unit, comprising an input terminal and an output terminal, wherein the input terminal thereof is coupled to the second input terminal of the switching unit, wherein, when the input terminal thereof receives the step size parameter, the step size parameter is determined and adjusted to be the adjusted step size parameter.

20. The communication system according to claim 19, wherein when the boundary value control unit determines that the received step size parameter is greater than or equal to a maximum step size boundary, the output terminal of the boundary value control unit outputs the maximum step size boundary, when the boundary value control unit determines that the received step size parameter is smaller than a minimum step size boundary, the output terminal of the boundary value control unit outputs the minimum step size boundary, when the boundary value control unit determines that the received step size parameter is between the maximum step size boundary and the minimum step size boundary, the output terminal of the boundary value control unit outputs the received step size parameter.

21. The communication system according to claim 15, wherein the received signal is represented as x(n), the adjusted step size parameter is represented as μ(n), the error signal is represented as e(n), the coefficient vector is $$w(n+1) = w(n) + \frac{\mu(n)}{x^T(n)x(n)+\varepsilon}x(n)e(n),$$

wherein the ϵ is a positive regulation parameter.

22. The communication system according to claim 15, wherein the pilot signal is represented as d(n), the convergence parameter is represented as $\zeta_1(n)$, wherein $$\zeta_1(n) = \frac{\hat{r}_{ex}(n)^T\hat{r}_{ex}(n)}{\hat{r}_{dx}(n)^T\hat{r}_{dx}(n)+c}$$

$\hat{r}_{ex}(n)$ is a cross-correlation between the input signal and the error signal, $\hat{r}_{dx}(n)$ is an estimate of $E\{x(n)d(n)\}$, wherein $E\{\bullet\}$ represents an expectation, $x(n)$ represents a vector of received signal from the channel, T represents an operation of transposition of a matrix.

23. The communication system according to claim 15, wherein the convergence parameter is represented as $\zeta_2(n)$, wherein $$\zeta_2(n) = \left| \frac{\hat{\sigma}_e^2(n) - \hat{\sigma}_v^2(n)}{\hat{\sigma}_d^2(n) - \hat{\sigma}_v^2(n)} \right|$$

$\hat{\sigma}_v^2(n)$ represents an energy of the noise signal, $\hat{\sigma}_e^2(n)$ represents an energy of the error signal, $\hat{\sigma}_d^2(n)$ represents an energy of the input audio signal.

24. The communication system according to claim 15, wherein the error signal is represented as $e(n)$, the pilot signal is represented as $d(n)$, the convergence parameter is represented as $\zeta_3(n)$, wherein $$\zeta_3(n) = \left| \frac{\hat{r}_{de}(n) - \hat{\sigma}_e^2(n)}{\hat{\sigma}_d^2(n) - \hat{r}_{de}(n)} \right|,$$

wherein $\hat{\sigma}_e^2(n)$ is an energy of the error signal, $\hat{\sigma}_d^2(n)$ is an energy of the pilot signal, $\hat{r}_{de}(n)$ is an estimate of $E\{d(n)e(n)\}$, wherein $E\{\bullet\}$ represents an expectation.

25. The communication system according to claim 15, wherein, when it is in a tracking mode, a decision signal is represented as $d(n)$, the convergence parameter is represented as $\zeta_1(n)$, wherein $$\zeta_1(n) = \frac{\hat{r}_{ex}(n)^T \hat{r}_{ex}(n)}{\hat{r}_{dx}(n)^T \hat{r}_{dx}(n) + c}$$

$\hat{r}_{ex}(n)$ is a cross-correlation between the input signal and the error signal, $\hat{r}_{dx}(n)$ is an estimate of $E\{x(n)d(n)\}$, wherein $E\{\bullet\}$ represents an expectation, $x(n)$ represents a vector of received signal from a channel, T represents an operation of transposition of a matrix.

26. The communication system according to claim 15, wherein, when it is in a tracking mode, the error signal is represented as $e(n)$, the decision signal is represented as $d(n)$, the convergence parameter is represented as $\zeta_3(n)$, wherein $$\zeta_3(n) = \left| \frac{\hat{r}_{de}(n) - \hat{\sigma}_e^2(n)}{\hat{\sigma}_d^2(n) - \hat{r}_{de}(n)} \right|,$$

wherein $\hat{\sigma}_e^2(n)$ is an energy of the error signal, $\hat{\sigma}_d^2(n)$ is an energy of the decision signal, $\hat{r}_{de}(n)$ is an estimate of $E\{d(n)e(n)\}$, wherein $E\{\bullet\}$ represents an expectation.

\* \* \* \* \*